United States Patent
Steffi

(10) Patent No.: US 10,533,576 B2
(45) Date of Patent: Jan. 14, 2020

(54) FAN INLET CONE FOR IMPROVED SEALING WITH A GENSET FAN AND HOUSING

(71) Applicant: Cummins Power Generation IP, Inc., Minneapolis, MN (US)

(72) Inventor: Leo Steffi, Plymouth, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 386 days.

(21) Appl. No.: 15/268,114

(22) Filed: Sep. 16, 2016

(65) Prior Publication Data
US 2018/0080469 A1   Mar. 22, 2018

(51) Int. Cl.
| | |
|---|---|
| F04D 29/40 | (2006.01) |
| F04D 29/58 | (2006.01) |
| F04D 25/08 | (2006.01) |
| F04D 29/66 | (2006.01) |
| H02K 9/06 | (2006.01) |
| H02K 7/18 | (2006.01) |

(52) U.S. Cl.
CPC ......... *F04D 29/403* (2013.01); *F04D 25/082* (2013.01); *F04D 29/584* (2013.01); *F04D 29/663* (2013.01); *H02K 7/1815* (2013.01); *H02K 9/06* (2013.01); *F05B 2220/706* (2013.01); *F05B 2240/121* (2013.01); *F05B 2240/14* (2013.01)

(58) Field of Classification Search
CPC .... F04D 29/403; F04D 29/663; F04D 25/082; F04D 29/584; H02K 7/1815; H02K 9/06; F05B 2240/14; F05B 2240/121; F05B 2220/706
See application file for complete search history.

(56) References Cited

U.S. PATENT DOCUMENTS

| | | | |
|---|---|---|---|
| 4,835,405 A | 5/1989 | Clancey et al. | |
| 4,856,470 A | 8/1989 | Ishii et al. | |
| 4,907,546 A | 3/1990 | Ishii et al. | |
| 5,626,105 A | 5/1997 | Locke et al. | |
| 5,965,999 A | 10/1999 | Frank | |
| 6,331,740 B1 | 12/2001 | Morohoshi et al. | |
| 6,489,690 B1 | 12/2002 | Hatsugai et al. | |
| 6,849,961 B2 | 2/2005 | Takizawa et al. | |

(Continued)

FOREIGN PATENT DOCUMENTS

EP    1 146 213    10/2001

*Primary Examiner* — Jacob M Amick
*Assistant Examiner* — Charles Brauch
(74) *Attorney, Agent, or Firm* — Foley & Lardner LLP

(57) ABSTRACT

Systems, methods, and apparatus for cooling a generator set are provided. One genset assembly includes a housing defining an internal volume and structured to allow air flow therethrough. The genset assembly further includes a generator operatively coupled to an engine within the internal volume via a genset shaft, the generator positioned within the internal volume of the housing. The genset further includes a fan operatively coupled to a first end of the genset shaft distal from the engine and an inlet cone, at least a portion of inlet cone is positioned within an outlet defined by the housing, the inlet cone rigidly coupled to at least one of the generator or the engine and positioned coaxially with respect to the fan about an axis of the genset shaft such that the inlet cone and the fan move in concert with one another.

31 Claims, 11 Drawing Sheets

(56) References Cited

U.S. PATENT DOCUMENTS

| | | |
|---|---|---|
| 7,492,050 B2 | 2/2009 | Brandenburg et al. |
| 8,093,732 B2 | 1/2012 | Hatsugai et al. |
| 8,125,110 B2 | 2/2012 | Bushnell et al. |
| 8,232,660 B2 | 7/2012 | Ito et al. |
| 8,556,585 B2 | 10/2013 | Abe et al. |
| 2005/0046191 A1 | 3/2005 | Cole et al. |
| 2010/0263609 A1* | 10/2010 | Klejeski .............. F01P 5/06 123/41.6 |
| 2010/0294585 A1* | 11/2010 | Wolff .............. H02K 5/24 180/298 |
| 2014/0246863 A1* | 9/2014 | Vallinayagam .......... H02K 9/02 290/1 B |
| 2015/0349609 A1 | 12/2015 | Tremelling et al. |

\* cited by examiner

FAN INLET CONE FOR IMPROVED SEALING WITH A GENSET FAN AND HOUSING

TECHNICAL FIELD

The present disclosure relates generally to sealing of generator set (genset) assemblies.

BACKGROUND

Gensets generally include an engine (e.g., an internal combustion engine such as diesel engine, a gasoline engine, a natural gas engine, a dual fuel engine, etc.) and a generator for producing electricity. Such gensets may include, for example, portable gensets, such as those used in consumer applications. The engine included in the genset is a significant source of noise. Such gensets may be used as a power source in residential areas. The noise produced by the engine in the genset may be a significant source of noise pollution and may even make it unsuitable for use in some locations. To reduce the noise produced by such gensets, the engine and generator of the genset may be enclosed in a housing. However, providing efficient cooling of the engine and the generator positioned within the housing is a significant challenge.

SUMMARY

Embodiments described herein relate generally to systems and methods for improving fan performance of a genset assembly and, in particular to genset assemblies that include an inlet cone used with a cooling fan. The inlet cone forms a low clearance interface with the fan to improve fan efficiency by reducing air leakage through the interface from the high-pressure side of the fan to the low-pressure side of the fan.

In a first set of embodiments, a genset assembly includes a housing defining an internal volume and structured to allow air flow therethrough. The genset assembly further includes a generator operatively coupled to an engine within the internal volume via a genset shaft, the generator positioned within the internal volume of the housing. The genset further includes a fan operatively coupled to a first end of the genset shaft distal from the engine and an inlet cone, at least a portion of inlet cone is positioned within an outlet defined by the housing, the inlet cone rigidly coupled to at least one of the generator or the engine and positioned coaxially with respect to the fan about an axis of the genset shaft such that the inlet cone and the fan move in concert with one another.

In a second set of embodiments, a cooling assembly for a genset that includes an engine and a generator operatively coupled to the engine via a genset shaft includes a housing defining an internal volume structured to house the engine and the generator, and to allow air flow therethrough, a fan structured to be operatively coupled to a first end of the genset shaft distal from the engine, and an inlet cone positioned within an outlet defined by the housing the inlet cone structured to be rigidly coupled to at least one of the generator or the engine and positioned coaxially with respect to the fan about an axis of the genset shaft such that the inlet cone and the fan move in concert with one another.

In a third set of embodiments, a method of cooling a genset assembly comprising an engine, a generator and a fan includes positioning an inlet cone within an outlet of a housing defining an internal volume and structured to allow air flow therethrough. The method further includes positioning the engine and the generator within the internal volume defined by the housing, coupling the fan to a first end of a genset shaft of the genset assembly located distal to the engine, and coupling the inlet cone to the genset assembly such that the inlet cone is positioned coaxially with respect to the fan about an axis of the genset shaft and the inlet cone and fan move in concert with one another.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1A:
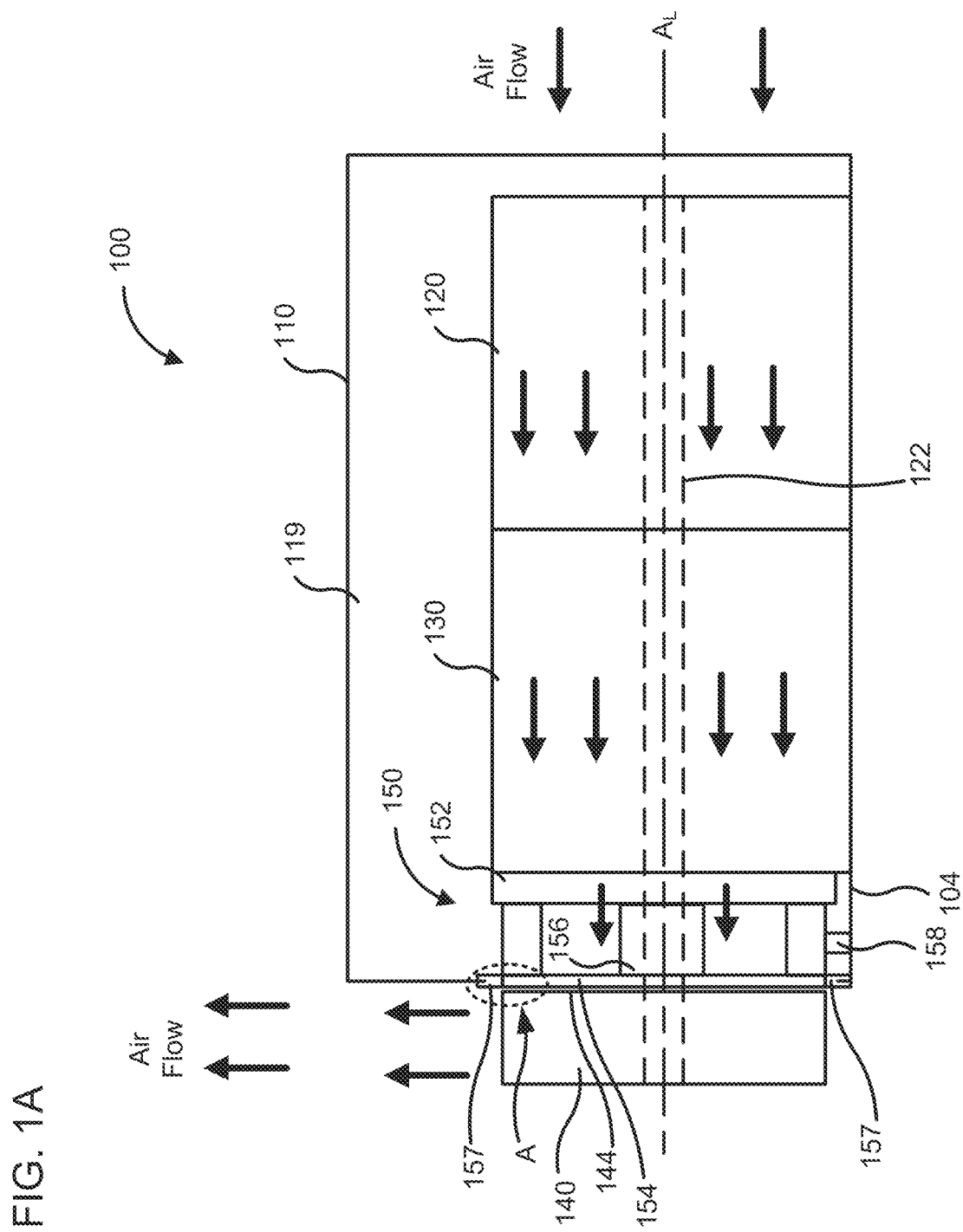
FIG. 1A is a schematic illustration of a side view of a genset assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for improving fan performance of a genset assembly and, in particular, to genset assemblies that include an inlet cone used with a cooling fan. The inlet cone forms a low clearance interface with the fan to improve fan efficiency by reducing air leakage through the interface from the high-pressure side of the fan to the low-pressure side of the fan.

Gensets generally include an engine (e.g., an internal combustion engine such as diesel engine, a gasoline engine, a natural gas engine, a dual fuel engine, etc.) and a generator for producing electricity. Such gensets may include, for example, portable gensets, such as gensets used in consumer applications, and may be either air cooled or liquid cooled, for example, including a cooling radiator. The engine included in the genset is a significant source of noise. Such gensets may have to be used as a power source in residential areas. The noise produced by the engine in the genset may be a significant source of noise pollution and may even make it unsuitable for use in such locations. To reduce the noise produced by such gensets, the engine and generator of the genset may be enclosed in a housing. However, providing efficient cooling of the engine and the generator positioned within the housing in a cost effective and efficient manner is a significant challenge.

In many genset implementations, a fan is coupled to a shaft of the engine or generator to drive air through the housing for cooling the engine and the generator. The fan can include axial fans or centrifugal fans. Particularly, centrifugal fans may provide a significant pressure differential for drawing air through the housing. The internal volume of the housing then serves as an air duct through which the air flows for cooling the engine and the generator. The pressure differential between the internal volume of the housing and outside the internal volume (i.e., the fan inlet and outlet) may cause air to leak back into the internal volume defined by the housing through any available openings and clearances. This may increase the noise leaking out of the housing, reduce a cooling efficiency of the fan and/or increase the power used by the fan to effectively cool the engine and the generator. For example, if the clearances provided around the fan are large, air leakage around the fan/housing interface may increase, fan efficiency may decrease, and fan tip turbulence may increase resulting in noise increase.

Some genset assemblies include two fans, one positioned at an inlet and one positioned near an outlet of the housing of the genset assembly, to provide an airflow through the housing. In some embodiments, one or more fans may be integrated in a genset assembly including an air cooled engine or a direct drive radiator cooled engine. However, use of two fans may cause the genset to use higher power thereby reducing an efficiency of the engine. Convoluted ducting may also be used to direct air flow to reduce noise and direct air cooling of the engine and the generator but may increase the complexity of the housing and resistance to air flow. Furthermore, engines are frequently mounted on isolators to minimize translated vibration. The isolators allow components of the genset to move relative to each other. This relative motion requires clearances (e.g., the fan, housing outlet, and inlet cone) which may reduce fan efficiency and increase fan noise.

Moreover, there is generally a trade-off between using high-pressure or low-pressure fans. Low-pressure fans may produce lower noise simplified sealing housing inlets and outlets. In contrast, high-pressure fans provide a higher velocity airflow, which provides better cooling and allows use of more complicated ducting. However, high differential pressures are more difficult to seal, are more prone to leakage, which may increase noise and may increase parasitic loads on the genset assembly 100.

Embodiments of the genset assemblies described herein may provide benefits including, for example: (1) providing a close tolerance seal or a substantially leak-tight seal with a fan positioned inside or outside a housing of the genset by moving the clearance required due to engine or generator vibrations out of a fan assembly so as to prevent air at high pressure downstream of the fan from flowing back in the internal volume which is at low pressure or vice versa; (2) axially aligning the engine, the generator, housing or inlet cone and the fan along a longitudinal axis of the genset assembly such that inlet cone and the fan move in the same direction relative to each other or otherwise do not move relative to each other, thereby maintain the close tolerance sealing therebetween; (3) providing a flexible sealing between the housing and the inlet cone thereby allowing the housing to move relative to the inlet cone while maintaining a close tolerance seal therebetween; (4) allowing very high pressure differences to be maintained between the internal volume and outside the internal volume, thereby increasing cooling efficiency of the genset as well as allowing use of noise reducing baffles and ducting with increased air flow resistance; (5) providing superior cooling without having complex ducting in the housing, thereby reducing a complexity of manufacturing the housing and reducing cost while providing effective sound attenuation; (6) obviating use of a secondary engine fan; (7) allowing housing and/or outlet clearances to be reduced, thereby increasing fan efficiency; and (8) reducing parasitic loads on the genset assembly.

As used herein, the term "leak-tight" is understood to encompass both a hermetic seal (i.e., a seal that is gas-impervious) as well as a seal that is liquid-impervious. While total fluid imperviousness is desirable, some minimal leakage due to manufacturing tolerances, or other practical considerations (such as, for example, the pressure applied to the seal and/or within the fluid), can occur even in a "leak-tight" seal.

FIG. 1A is a schematic illustration of a side cross-section of a genset assembly 100 according to an embodiment. The generator assembly 100 may include a portable or residential genset having a power rating, for example in the range of 2 kW to 25 kW. The genset assembly 100 includes a housing 110, an engine 120, a generator 130, a fan 140 and an inlet cone 150. The genset assembly 100 may be a back-up power source in the event of a loss of electrical grid power. In one embodiment, the genset assembly 100 may serve as the primary power source when grid electricity is not being used or when grid electricity fails. In some embodiments, the genset assembly 100 may be provided as a secondary source of power for homes or businesses. In some embodiments, the genset assembly 100 may be the primary source of power where grid power is not readily available, such as remote locations or construction sites.

The housing 110 defines an internal volume 119 structured to allow air flow therethrough. The engine 120 and the generator 130 are positioned within the internal volume 112 defined by the housing 110. For example, the engine 120 and the generator 130 may be positioned on a base 104 and the housing 110 may be positioned on the base 104 around the engine 120 and the generator 130.

The housing 110 may include a plurality of sidewalls coupled to each other so as to define the internal volume 119. A first inlet may be defined in a first sidewall of the housing 110 (e.g., the first set of inlets 211/213 defined in a first sidewall 212 of a housing 210 of the genset assembly 200 as shown in FIGS. 2-9) positioned proximate to an engine first end of the engine 120 which is distal from the fan 140 as, shown in FIG. 1A. The first inlet may be structured to deliver air to the engine 120.

The housing 110 may further comprise a second inlet (e.g., the second inlet 215 defined in a second sidewall 214 of the housing 210 as shown in FIGS. 2-9) positioned orthogonal to the first sidewall. The second inlet may optionally be structured to deliver air to the generator 130 positioned within the internal volume 119 so as to provide direct cooling air to the generator 130 and/or electronics positioned within the housing 110. Furthermore, a third outlet may be defined in a third sidewall of the housing 110 positioned opposite the first sidewall. The combination of the inlet (e.g., the first inlet and the second inlet) and the outlet may provide unidirectional flow path for air flow through the housing 110, so as to cool the engine 120 and the generator 130.

The engine 120 may include an IC engine (e.g., a diesel engine, a gasoline engine, a natural gas engine, a dual fuel engine, an ethanol engine, a biodiesel engine, etc.) which converts fuel (e.g., diesel, gasoline, natural gas, ethanol, etc.) into mechanical energy. Combustion of fuel by the engine 120 produces an exhaust gas (e.g., a diesel exhaust gas) that can include NOx gases, carbon monoxide, and/or other harmful pollutants which should be reduced or otherwise treated before expelling into the environment. In some embodiments, an aftertreatment system may be fluidly coupled to the engine and configured to receive and treat an exhaust gas produced by the engine 120. The aftertreatment system may be positioned in the internal volume 119 defined by the housing 110. The engine 120 may be either air cooled or liquid cooled, and have a radiator positioned within the air flow path.

The generator 130 is operatively coupled to the engine 120 via a genset shaft 122. For example, the genset shaft 122 may comprise a crankshaft of the engine 120 coupled to a generator shaft of the generator 130. The generator 130 is also positioned within the internal volume 119 of the housing 110, for example downstream of the engine 120 with respect to a direction of air flow through the internal volume 119. In some embodiments, a genset casing of the generator 130 may be physically coupled to an engine casing of the engine 120, for example via fasteners (e.g., screws, bolts, pins, rivets, etc.), welding, a snap-fit mechanism or any other suitable coupling mechanism.

The generator 130 may include a wound rotor or permanent magnet alternator configured to convert a rotational mechanical power produced by the engine 120 into electrical energy as a direct current (DC) or synchronous alternating current (AC) generator. In some embodiments, an inverter can also be electrically coupled to the generator 130, and the genset assembly 100 may be variable speed. The generator 130 is configured to produce an electrical output. The electrical output can include a voltage and/or a current, and is representative of a load on the engine 120. For example, the electrical output can correspond to the engine 120 power (e.g., power=voltage×current). In particular embodiments, the electrical output from the generator 130 can be converted or inverted to transform the electrical output from a variable AC or a direct current (DC) to a synchronous 50 Hz or 60 Hz alternating current (AC).

The fan 140 is operatively coupled to a first end of the genset shaft 122 distal from the engine 120 (e.g., opposite the first sidewall of the housing 110, downstream of the engine 120 and generator 130 with respect to a direction of air flow). The fan 140 may include a centrifugal fan, a centripetal fan, an axial flow fan or any other suitable fan. The first end of the genset shaft 122 may include a non-driving end of the genset shaft 122. The fan 140 may include a centrifugal fan which includes a plurality of vanes. The fan 140 is positioned partially or fully outside the internal volume 119 defined by the housing 110. The fan 140 may be configured to draw air into the housing 110 (e.g., through the first inlet and the second inlet) so as to cause the air to flow over the engine 120 and the generator 130. Furthermore, the fan 140 may cause the air to flow through the inlet cone 150 as described herein, and out of the housing 110 via the outlet defined in the housing 110 such that the air flow is substantially along a longitudinal axis $A_L$ of the genset assembly 100.

The fan 140 and the enclosed housing 110 causes air to flow through the internal volume of the housing at very high pressure. For example, a pressure difference between high pressure air downstream of the outlet and low pressure air upstream of the outlet may be in the range of 2 to 10 inches of water, inclusive of all range and values therebetween. This high pressure airflow provides efficient cooling of the engine 120 and the generator 130 so that the engine 120 and/or the generator may be cooled with using a radiator and/or a liquid coolant (e.g., water or any other coolant). High pressure air flow cooling may provide better noise attenuation, reduce fan turbulence which may increase a fan air flow efficiency, and provide superior cooling such that the internal volume 112 of the housing 112 may be significantly reduced so as to provide a compact genset assembly. In some embodiments, the housing 110 may also include air ducts fluidly coupled to air inlets and/or air outlets or exhaust to further reduce noise. The housing 110 may also include ducting for an aftertreatment system or muffler of the genset assembly 100. High pressure ducted air may advantageously provide a more consistent air flow increasing cooling efficiency for air cooling of engine 120, generator 130 and/or radiators, as well as reduce hot spots or pockets of dead air.

The inlet cone 150 is positioned between the generator 130 and the fan 140 within the internal volume 119 of the housing 110, in the illustrated embodiment. In some embodiments, a fan may be positioned within an internal volume of a housing, and an inlet cone may be positioned on a side of the fan opposite a generator. The inlet cone 150 comprises an inlet cone first portion 152, an inlet cone second portion 154 and an inlet cone third portion 156. The inlet cone first portion 152 is positioned proximate to the generator 130. For example, the inlet cone first portion 152 may be coupled to the generator casing of the generator 130, abut the generator casing and/or be positioned around a portion of the generator casing. For example, the inlet cone first portion 152 may be molded or shaped so as to conform to at least an outside surface of a portion of the generator casing of the generator 130. Ribs or protrusions (not shown) may be defined on an outer surface of the portion of the generator casing which may correspond to mating grooves or indentations in the inlet cone first portion 152 so as to allow alignment and/or securing of the inlet cone first portion 152 on the portion of the genset casing of the generator 130.

At least a portion of the inlet cone 150 is positioned within an outlet defined by the housing 110. The inlet cone 150 is rigidly coupled to the generator 130 in a manner such that the inlet cone 150 is coaxial with the fan 140 about an axis of the genset shaft 122. As a result, the inlet cone 150 moves in concert with the fan 140. In some embodiments, this allows the inlet cone 150 and the fan 140 to move together in response to movement/vibration of the genset so that the close tolerance seal is not interrupted due to vibration.

An inlet cone second portion 154 of the inlet cone 150 is positioned opposite the inlet cone first portion 152. The inlet cone second portion 154 is positioned within the outlet defined in the housing 110. The inlet cone second portion 154 may be positioned proximate to a fan sealing portion 144 of the fan 140 so as to form a close tolerance (e.g., a substantially leak-tight) seal therewith, which prevents air downstream of the outlet from flowing into or out of the internal volume 119 of the housing 110. As described herein, the term "proximate to" implies that the inlet cone second portion 154 may be positioned parallel to the fan sealing portion 144, abut the fan sealing portion 144, an outer edge of the inlet cone second portion surrounding and concentric with an edge of the fan 140 which defined the fan sealing portion 144, and/or positioned adjacent to but separated from the fan sealing portion 144 by a distance (e.g., a fixed or a variable distance). The distance may be sufficiently small so as to provide a close tolerance seal between the inlet cone second portion 154 and the fan sealing portion 144, for example less than 0.2 inches, sufficient to withstand the high pressure difference across the outlet of the housing 110. In some embodiments, the close tolerance seal may be accomplished using a gap between components of less than or equal to approximately fifty thousandths of an inch.

Figure 1B:
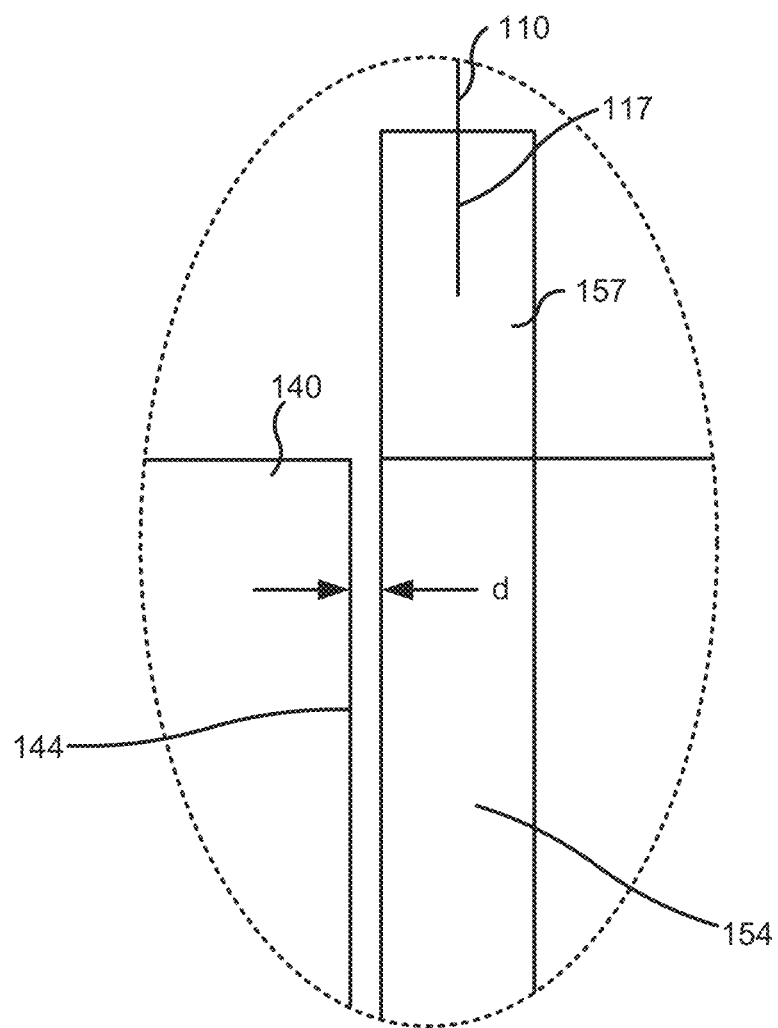
FIG. 1B is an enlarged view of a portion of the generator assembly of FIG. 1A shown by the arrow A in FIG. 1A.

Expanding further, FIG. 1B shows an enlarged view of a portion of the genset assembly 100 shown by the arrow A in FIG. 1A. As shown in FIG. 1B, the inlet cone second portion 154 is positioned proximate to (e.g., positioned adjacent to, abutting the fan sealing portion 144 or separated from the fan sealing portion 144 by a distance) the fan sealing portion 144 (e.g., a surface of an outer edge of the fan proximate to the inlet cone second portion 154) so as to form a close tolerance or substantially leak-tight seal therewith. In some embodiments, the inlet cone 150 is stationary and forms a simple close tolerance seal with the fan sealing portion 144 of the fan.

For example, a distance d between the inlet cone second portion 154 and the fan sealing portion 144 may be sufficiently small so as to create a close tolerance seal capable of substantially preventing high pressure air downstream of the fan 140 from flowing back into the internal volume 119 of the housing 110 between the inlet cone second portion 154 and the fan sealing portion 144. In some embodiments, the distance d may be less than 0.2 inches. In some embodiments, the distance d may be equal to or less than 0.05 inches. As used herein the term "substantially preventing" refers to allowing less than 5%, 4%, 3%, 2% or 1% of the high pressure air downstream of the outlet from flowing back into the internal volume 119 due to the close tolerance seal. In some embodiments, the close tolerance seal may be sufficient to withstand a pressure differential between a downstream side and an upstream side of the outlet in the range of 2 to 10 inches of water inclusive of all ranges and values therebetween.

Furthermore, a flexible sealing member 157 may be positioned between an edge 117 of the outlet of the housing 110 (FIG. 1B) and the inlet cone second portion 154. The flexible sealing member 157 may include a bulb seal, a bulb gasket or any other flexible sealing member configured to provide a close tolerance seal between the housing 110 and the inlet cone 150. In this manner, the inlet cone 150 serves to provide a close tolerance seal with each of the housing 110 and fan 140. The flexible sealing member 157 may be configured to allow slight movement of the inlet cone 150 relative to the housing 110 (e.g., due to vibration caused during operation of the engine) while maintaining the close tolerance seal therebetween.

The inlet cone third portion 156 couples the inlet cone first portion 152 to the inlet cone second portion 154. For example, the inlet cone third portion 156 may include a plurality of plates coupling the inlet cone first portion 152 to the inlet cone second portion 154. The inlet cone third portion 156 may be structured to direct the air towards the fan 140 via the outlet. For example, the include inlet cone third portion 156 may include curved or contoured plates structured to guide the air flow towards the fan 140.

The inlet cone 150 is positioned about the genset shaft 122. For example, at least a portion of the inlet cone third portion 156 may define a sleeve positioned around at least a portion of the genset shaft 122. In some embodiments, a bearing may be positioned with the sleeve defined by the inlet cone third portion 156 positioned around the genset shaft 122. The inlet cone 150 is axially aligned with the fan 140 along the longitudinal axis $A_L$ of the genset assembly 100 (i.e., along the genset shaft 122). In some embodiments, a plurality of coupling rods (e.g., the coupling rods 259 included in the genset assembly 200) may be used to couple the inlet cone third portion 156 to the generator 130 and/or the engine 120, for example an engine casing of the engine 120.

Coupling of the inlet cone 150 with the generator 130 and/or the engine 120 as well as axially aligning the engine 120, the generator 130, the fan 140 and the inlet cone 150 about the longitudinal axis $A_L$ causes the inlet cone 150 and the fan 140 to move together (e.g., due to vibrations during operation) such that the inlet cone 150 does not move or moves negligibly relative to the fan 140. Therefore, the close tolerance seal therebetween is maintained even in the presence of vibrations or sudden movements of the engine 120 and/or the generator 130. Furthermore, the flexible sealing member 157 provides some flexibility for movement of the inlet cone 150 (e.g., due to movement of the engine 120 and/or generator 130) while maintaining the close tolerance seal between the outlet of the housing 110 and the inlet cone second portion 154. Thus, the close tolerance seal formed by the inlet cone 150 is resilient to vibrations, shocks and/or sudden movements.

The inlet cone second portion 154 may also be coupled to the base 104. For example, as shown in FIG. 1A, a shock absorber 158 may be used to coupling the inlet cone second portion 154 to the base 104. The shock absorber 158 may include a spring isolator, a dampers, a rubber block, a metal blocks or any other suitable mounting member, and can be structured to provide shock absorbing and/or vibration damping capabilities.

It is to be appreciated that while a particular arrangement of the fan 140 and the inlet cone 150 are shown with respect to FIGS. 1A-B and described herein, in other embodiments, the fan 140 and inlet cone 150 may be positioned at any suitable location in the housing 110, and relative to the engine 120 and the generator 130. For example, as described above, the fan 140 may be positioned outside housing 110 with the inlet cone 140, the outlet of the housing 110, and the fan 140 co-vibrational with the fan 140 and vibrationally sealed to housing 110.

In some embodiments, the fan 140 (e.g., a housing of the fan 140) may be mounted to the engine 120 and/or the generator 130, a vibration seal may be positioned between the fan 140 and the housing 110 and/or an exterior enclosure. In some embodiments, the fan 140 may be positioned inside the internal volume of the housing 110 with the outlet of the housing 110, the fan 140, and the inlet cone 150 vibration sealed to the housing 110 and/or an external enclosure. Furthermore, the fan 140 may be used to push air in or draw out air from the housing 110. The fan 140 may be positioned at front of the engine 120 or at a front end of the generator 130. Air flow may be from the generator 130 over the engine 120, or from the engine 120 over the generator 130.

FIGS. 2-9 are various views of a genset assembly 200 according to another embodiment. The genset assembly 200 may include a portable or residential genset having a power rating, for example in the range of 2 kW to 25 kW. The genset assembly 200 includes a housing 210, an engine 220, a generator 230, a fan 240 and an inlet cone 250.

Figure 2:
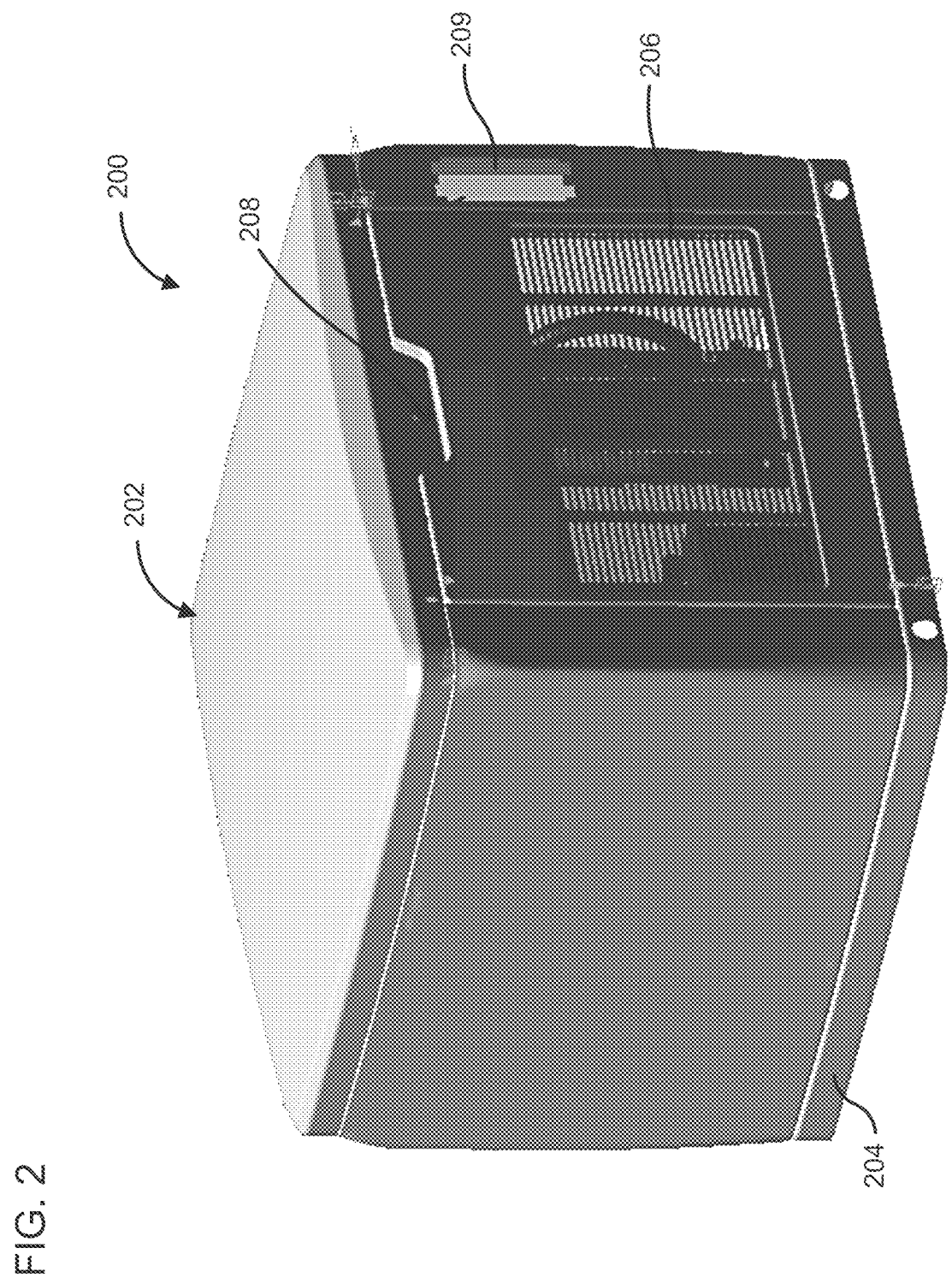
FIG. 2 is a perspective view of an enclosure housing a genset assembly, according to an embodiment.

The genset assembly 200 may be housed within an enclosure 202 (FIG. 2). The enclosure 202 is coupled to a base 204 on which the components of the genset assembly 200 may be positioned, as described herein. The enclosure 202 may be formed from a strong an rigid material, for example plastic, metals, polymers, etc. and configured to protect the components of the genset assembly 200 from the environment, for example sunlight, rain, wind etc. The enclosure 202 may include a plurality of louvers 206 to allow air flow in and out of the enclosure 202. The enclosure 202 may also include a locking mechanism 208, for example a lock and key cylinder configured to prevent unauthorized personnel from opening the enclosure 202 and accessing the genset assembly 200 positioned therewithin. Furthermore, an electrical panel 209 may be provided on a sidewall of the enclosure 202. The electrical panel 209 may include one or more input mechanisms (e.g., such as an on/off button, emergency shutdown button, switches, throttle lever, etc.) fuses, circuit breakers, display panel or any other electrical component. A door may be positioned on the electrical panel 209.

The housing 210 (FIGS. 3 and 4) defines an internal volume 219 (FIGS. 5-8) structured to allow air flow therethrough. The engine 220 and the generator 230 are positioned within the internal volume 219 defined by the housing 210. For example, the engine 220 and the generator 230 may be positioned on the base 204 and the housing 210 may be positioned on the base 204 around the engine 220 and the generator 230. The housing 210 may be secured to the base 204, for example via fasteners (e.g., screws, buts, bolts, rivets, etc.)

Figure 3:
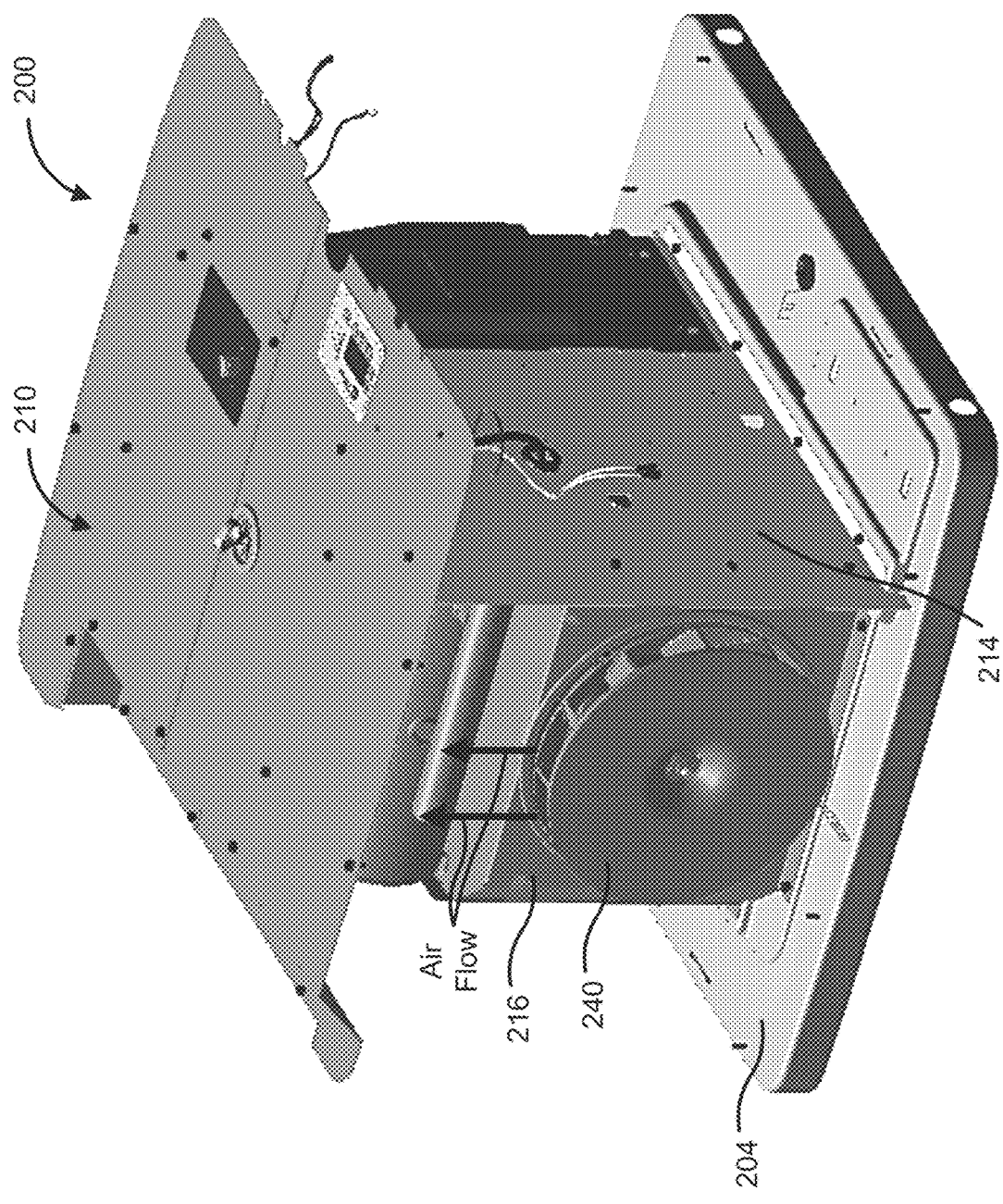
FIG. 3 is a perspective view of the genset assembly of FIG. 2 with the enclosure removed.
Figure 4:
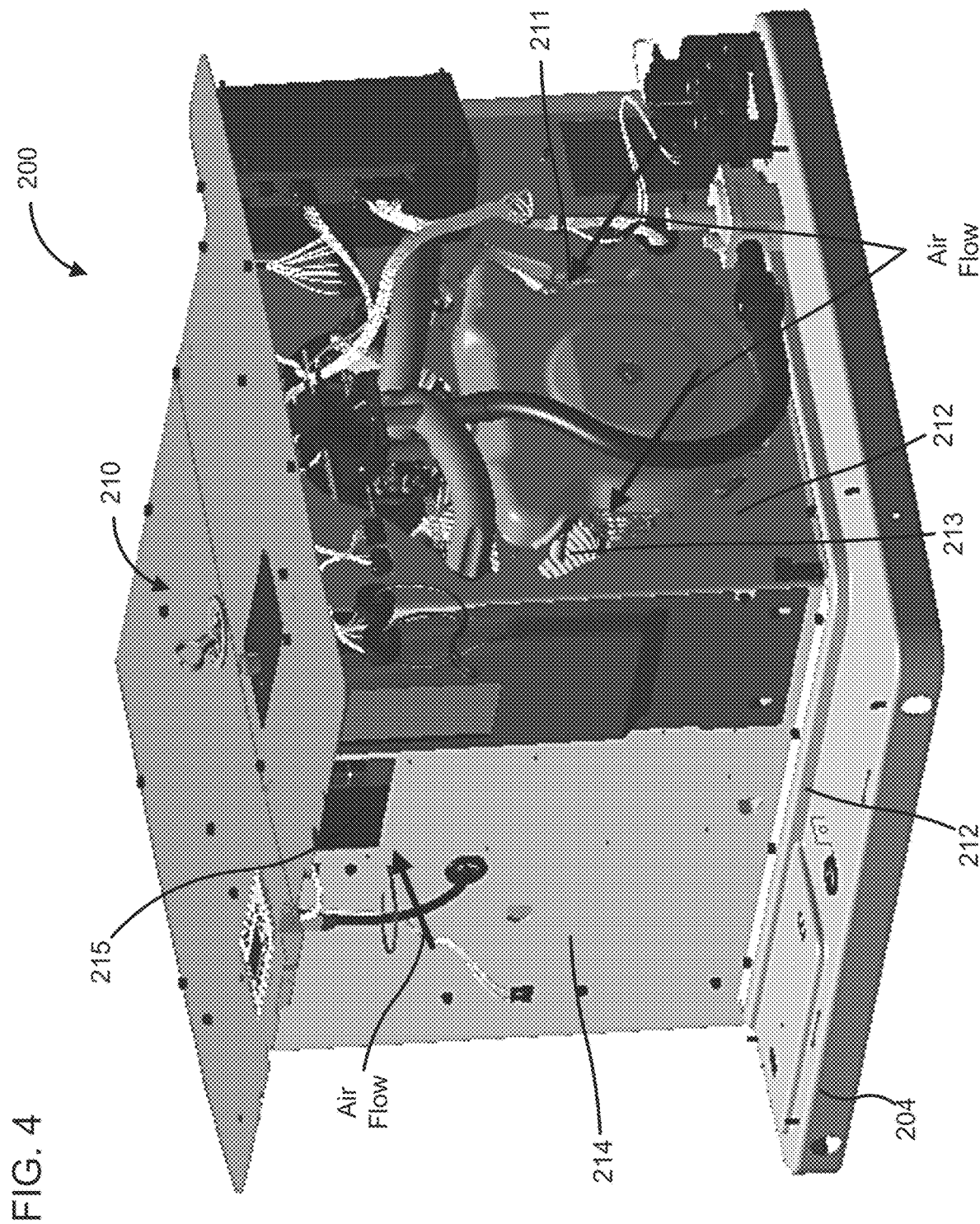
FIG. 4 is a back perspective view of the genset assembly of FIG. 3.
Figure 5:
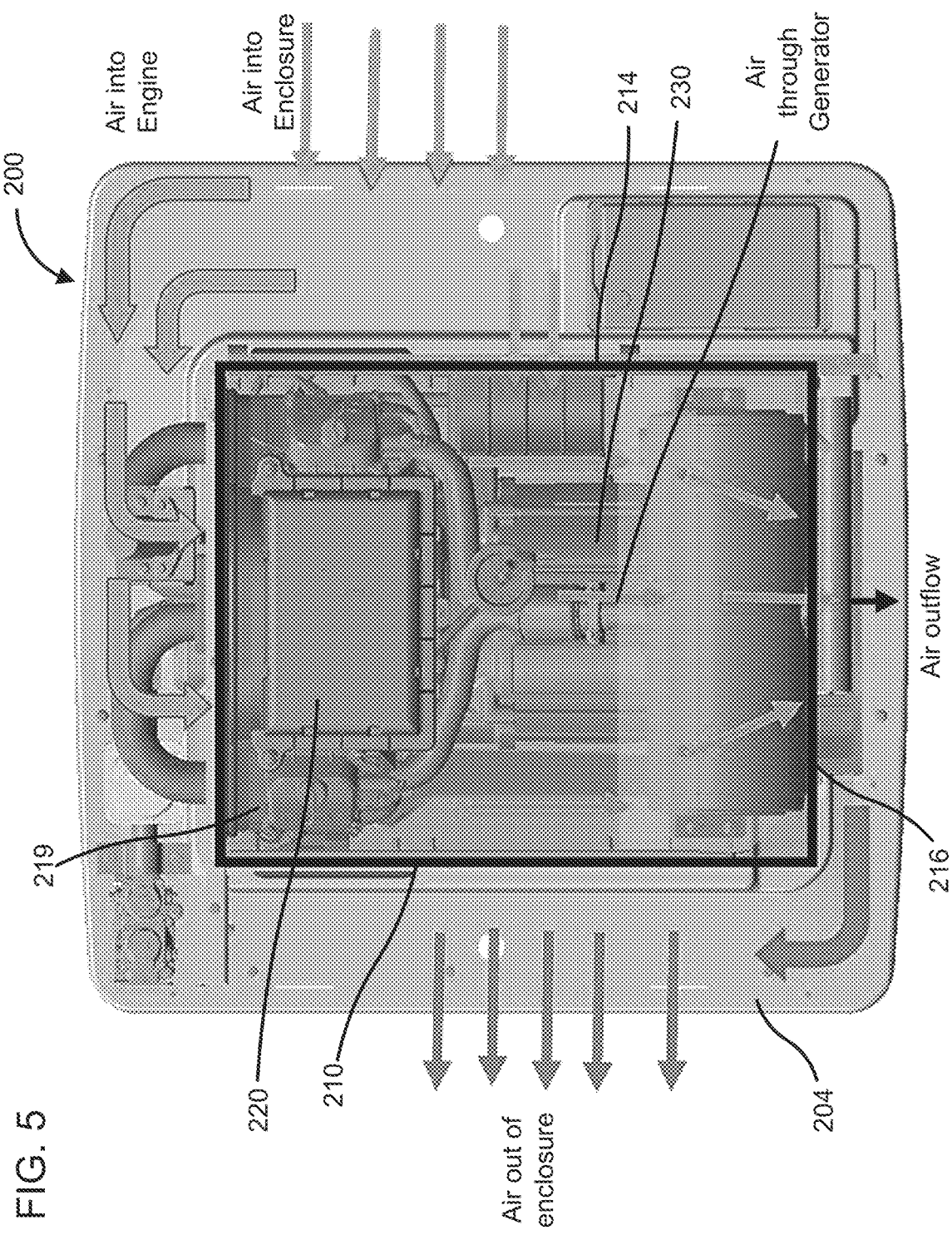
FIG. 5 is a top view of the genset assembly of FIG. 3 showing a direction of air flow through a housing of the genset; the housing is shown transparent in FIG. 5.

The housing 210 includes a plurality of sidewalls coupled to each other so as to define the internal volume 219. A first set of inlets 211 and 213 are defined in a first sidewall 212 of the housing 210, as shown in FIGS. 3-5. The first sidewall 212 of the housing 210 is positioned proximate to an engine first end of the engine 220 which is distal from the fan 240 as shown in FIGS. 3-5. The engine first end includes a driving end of the engine 220. The first set of inlets 211/213 may be structured to deliver air to the engine 220.

The housing 210 also comprises a second inlet 215 defined in a second sidewall 214 of the housing 210 positioned orthogonal to the first sidewall 212. The second inlet 215 is structured to deliver air to the generator 230 positioned within the internal volume 219. Furthermore, an outlet is defined in a third sidewall 216 of the housing 210 positioned opposite the first sidewall 212 behind the fan 240. In some embodiments, louvers, slits, slots, or a wire mesh may be positioned on the first set of inlets 211/213 and/or the second inlet 215 so as to prevent debris (e.g., rock, organic matter, etc.) from entering the internal volume 219 while allowing air to enter the internal volume 219.

Figure 7:
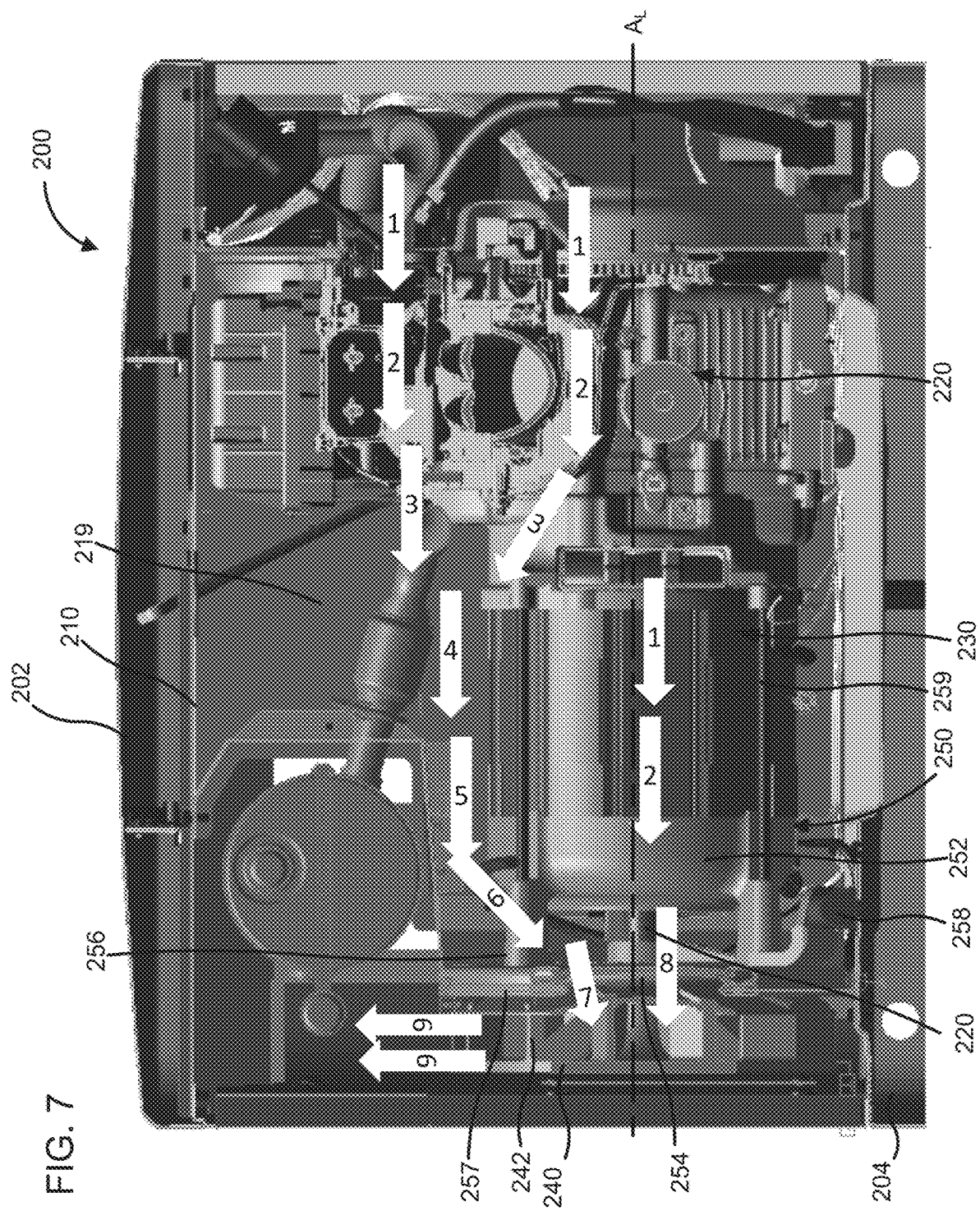
FIG. 7 is another side cross-section of the genset assembly of FIG. 3 showing a direction of air flow through the housing of the genset assembly.

The combination of the first set of inlets 211/213, the second inlet 215 and the outlet may provide unidirectional flow path for air flow through the housing 210, so as to cool the engine 220 and the generator 230. For example, as shown in FIGS. 5 and 7, the fan 240 drives the air out the outlet (e.g., in a tangential direction to the fan 240) and out of the enclosure 202 (not shown in FIG. 5 for clarity). This creates a low pressure in the internal volume 219 of the housing 210, which draws air into the internal volume 219 via the first set of inlets 211/213 and the second inlet 215. Once inside the internal volume 219, the air flow is directed in a unidirectional flow path along the longitudinal axis $A_L$ of the genset assembly 200 within the internal volume 219. The air flows over the engine 220 and generator 230, thereby cooling the engine 220 and the generator 230. The air flow is then directed through the inlet cone 250, at least a portion of which is disposed within the outlet as described herein, and driven out of the outlet (and eventually the enclosure 202) by the fan 240.

The engine 220 can include an IC engine (e.g., a diesel engine, a gasoline engine, a natural gas engine, a dual fuel engine, an ethanol engine, a biodiesel engine etc.) which converts fuel (e.g., diesel, gasoline, natural gas, ethanol, etc.) into mechanical energy. The engine 220 can be substantially similar to the engine 120 and therefore, not described in further detail herein.

The generator 230 is operatively coupled to the engine 220 via a genset shaft 222. For example, the genset shaft 222 may comprise a crankshaft of the engine 220 coupled to a generator shaft of the generator 230. The generator 230 is also positioned within the internal volume 219 of the housing 210, for example downstream of the engine 220 with respect to a direction of air flow through the internal volume 219. In some embodiments, a genset casing of the generator 230 may be physically coupled to an engine casing of the engine 220, for example via fasteners (e.g., screws, bolts, pins, rivets, etc.), welding, a snap-fit mechanism or any other suitable coupling mechanism. The generator 230 may be substantially similar to the generator 130 and, therefore not described herein further detail herein.

The fan 240 is operatively coupled to a first end of the genset shaft 222 distal from the engine 220 (e.g., opposite the first sidewall 212 of the housing 210, downstream of the engine 220 and generator 230 with respect to a direction of air flow.) The first end of the genset shaft 222 may include a non-driving end of the genset shaft 222. The fan 240 may include a centrifugal fan which includes a plurality of vanes 242. The fan 240 is positioned outside the internal volume 219 defined by the housing 210. The fan 240 may be configured to draw air into the housing 210 (e.g., through the first set of inlets 211/213 and the second inlet 215) so as to cause the air to flow over the engine 220 and the generator 230. Furthermore, the fan 240 may cause the air to flow through the inlet cone 250 as described herein, and out of the housing 210 via the outlet defined in the housing 210 such that the air flow is substantially along the longitudinal axis $A_L$ of the genset assembly 200.

The inlet cone 250 is positioned between the generator 230 and the fan 240 within the internal volume 219 of the housing 210. The inlet cone 250 includes an inlet cone first portion 252, an inlet cone second portion 254 and an inlet cone third portion 256. The inlet cone first portion 252 is positioned proximate to the generator 230. For example, the inlet cone first portion 252 may be coupled to the generator casing of the generator 230, abut the generator casing and/or be positioned around a portion of the generator casing. For example, the inlet cone first portion 252 may be molded or shaped so as to conform to at least an outside surface of portion of the generator casing of the generator 230. Ribs or protrusions (not shown) may be defined on an outer surface of the portion of the generator casing which may correspond to mating grooves or indentations in the inlet cone first portion 252 so as to allow alignment and/or securing of the inlet cone first portion 252 on the portion of the genset casing of the generator 230.

An inlet cone second portion 254 of the inlet cone 250 is positioned opposite the inlet cone first portion 252. The inlet cone second portion 254 is positioned within the outlet defined in the housing 210. The inlet cone second portion 254 may be positioned proximate to a fan sealing portion 244 of the fan 240 so as to form a close tolerance or substantially leak-tight seal therewith which prevents air downstream of the outlet from flowing into the internal volume 219 of the housing 210.

Figure 8:
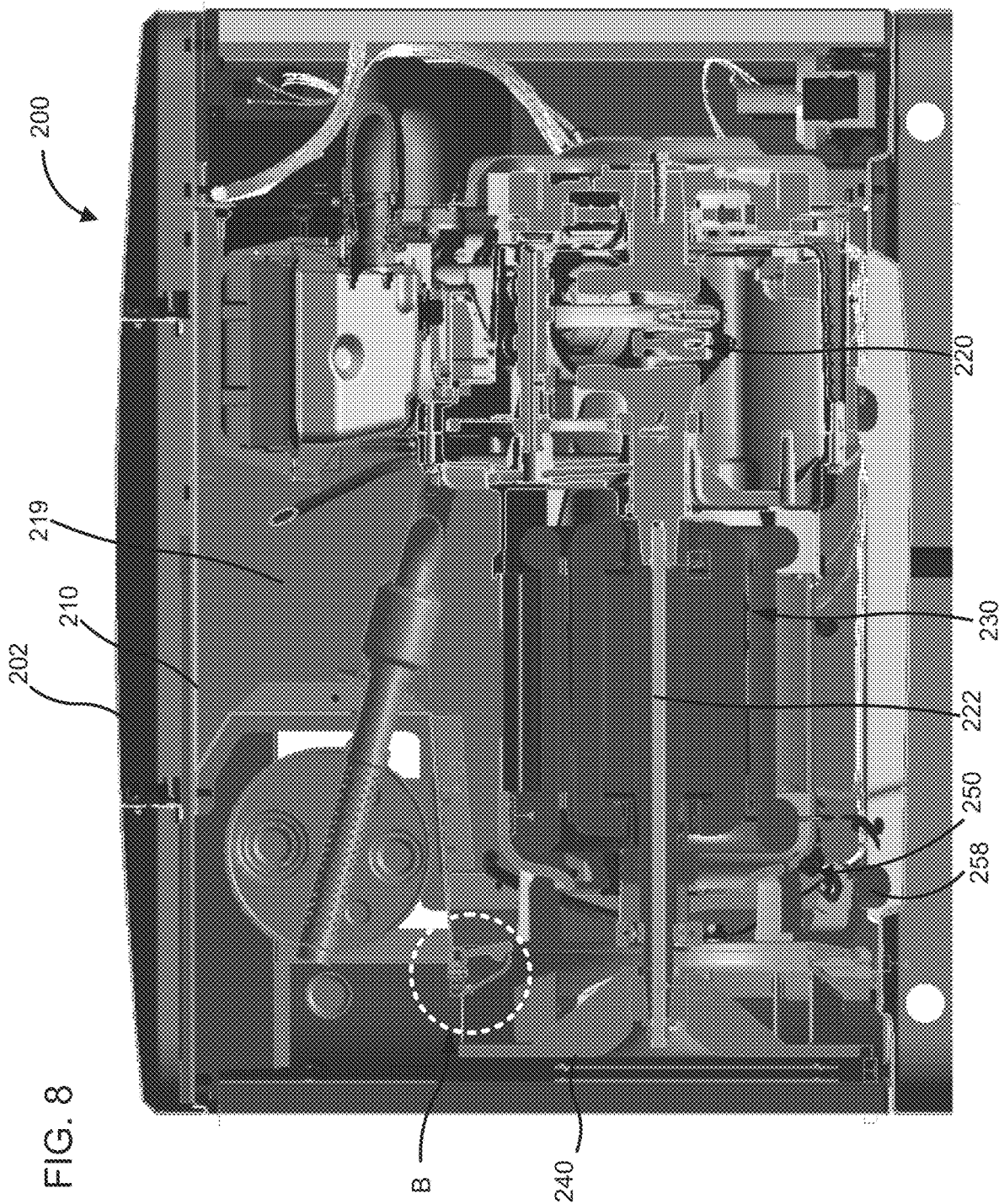
FIG. 8 is still another side cross-section of the genset assembly of FIG. 3 with a portion of genset assembly where the inlet cone forms a close tolerance seal with a fan sealing portion of the fan and an edge of the housing identified by the arrow B.
Figure 9:
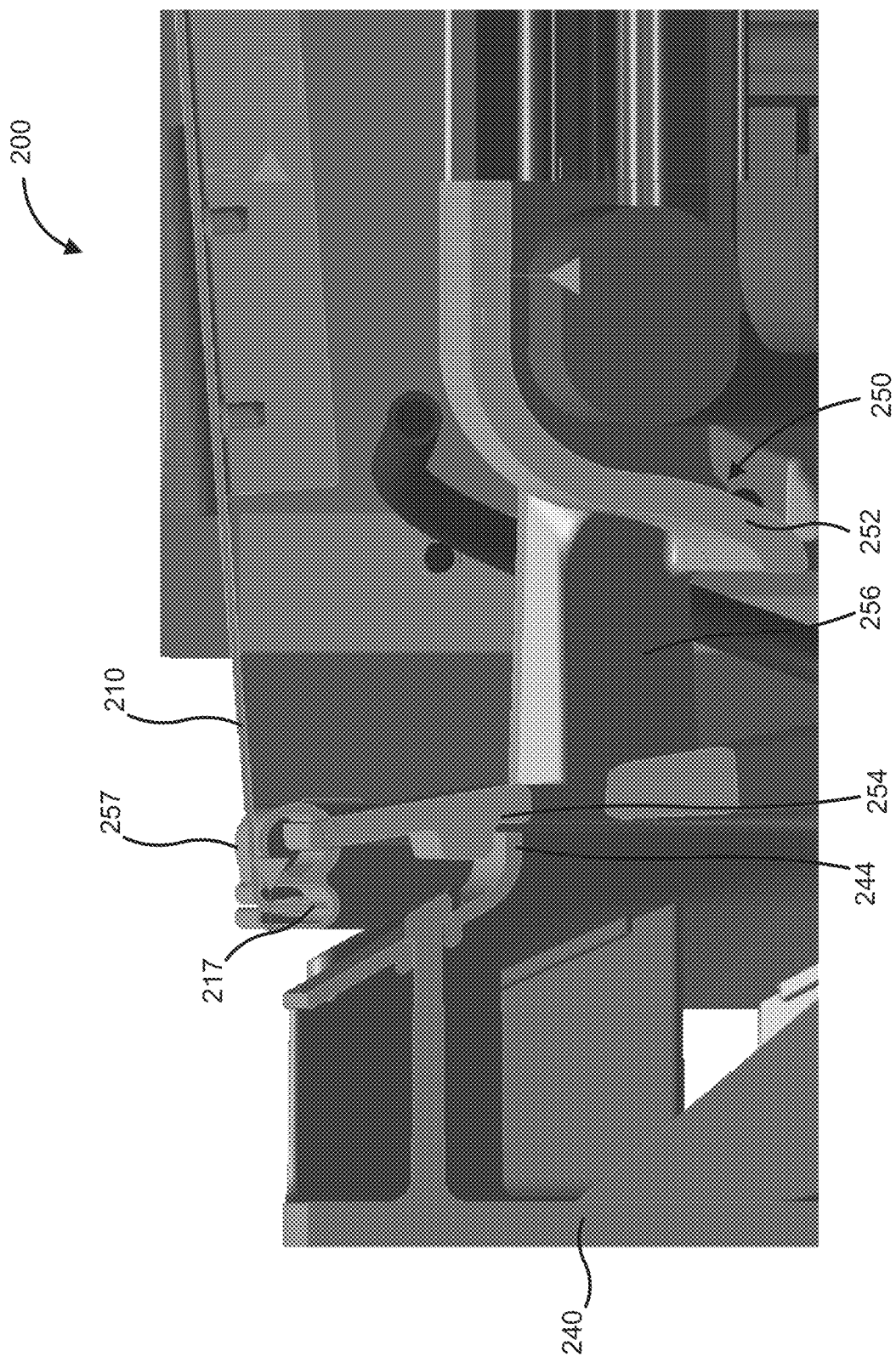
FIG. 9 is an enlarged view of the portion of the genset shown by the arrow B in FIG. 8.

FIG. 9 shows an enlarged view of a portion of the genset assembly 200 shown by the arrow B in FIG. 8. As shown in FIG. 9, the inlet cone second portion 254 is positioned proximate to (e.g., positioned adjacent to, abutting the fan sealing portion 244 or separated from the fan sealing portion by a distance) the fan sealing portion 244 for example, a surface of an outer edge of the fan 240 proximate to the inlet cone second portion 254 so as to form a close tolerance or substantially leak-tight seal therewith. The inlet cone 250 is stationary and forms a close tolerance seal with the fan sealing portion 244 of the fan.

For example, a distance between the inlet cone second portion 254 and the fan sealing portion 244 may be sufficiently small so as to create the close tolerance seal capable of substantially preventing high pressure air downstream of the fan 240 from flowing back into the internal volume 219 of the housing 210 between the inlet cone second portion 254 and the fan sealing portion 244. In some embodiments, the distance may be less than 0.2 inches. In some embodiments, the close tolerance seal may be sufficient to withstand a pressure differential between downstream side and upstream side of the outlet in the range of 2 to 10 inches of water inclusive of all ranges and values therebetween.

Furthermore, a flexible sealing member 257 may be positioned between the edge 217 of the outlet of the housing 210 and the inlet cone second portion 254. The flexible sealing member 257 may include a bulb seal, a bulb gasket of any other flexible sealing member and is configured to provide a close tolerance seal between the housing 210 and the inlet cone 250. In this manner, the inlet cone 250 serves to provide a close tolerance seal with each of the housing 210 and fan 240.

The inlet cone third portion 256 couples the inlet cone first portion 252 to the inlet cone second portion 254. For example, the inlet cone third portion 256 may include a plurality of plates coupling the inlet cone first portion 252 to the inlet cone second portion 254. The inlet cone third portion 256 may be structured to direct the air towards the fan 240 via the outlet. For example, the inlet cone third portion 256 may include curved or contoured plates structured to guide the air flow towards the fan 240.

The inlet cone is positioned about the genset shaft 222. For example, at least a portion of the inlet cone third portion 256 may define a sleeve positioned around at least a portion of the genset shaft 222. In some embodiments, a bearing may be positioned with the sleeve defined by the inlet cone third portion 256 positioned around the genset shaft 222. The inlet cone 250 is axially aligned with the fan 240 along the longitudinal axis $A_L$ of the genset assembly 200 (i.e., along the genset shaft 222). In some embodiments, a plurality of coupling rods 259 may be used to couple the inlet cone third portion 256 to the generator 230 and/or the engine 220, for example an engine casing of the engine 220.

Coupling of the inlet cone 250 with the generator 230 and/or the engine 220 as well as axially aligning the engine 220, the generator 230, the fan 240 and the inlet cone 250 about the longitudinal axis $A_L$ causes the inlet cone 250 and the fan 240 to move together (e.g., due to vibrations during operation) such that the inlet cone 250 does not move or moves negligibly relative to the fan 240. Therefore, the close tolerance seal therebetween is maintained even in the presence of vibrations or sudden movements of the engine 220 and/or the generator 230. Furthermore, the flexible sealing member 257 provides some flexibility for movement of the inlet cone 250 (e.g., due to movement of the engine 220 and/or generator 230) while maintaining the close tolerance seal between the outlet of the housing 210 and the inlet cone second portion 254. Thus, the close tolerance seal formed by the inlet cone 250 is resilient to vibrations, shocks or sudden movements.

Figure 6:
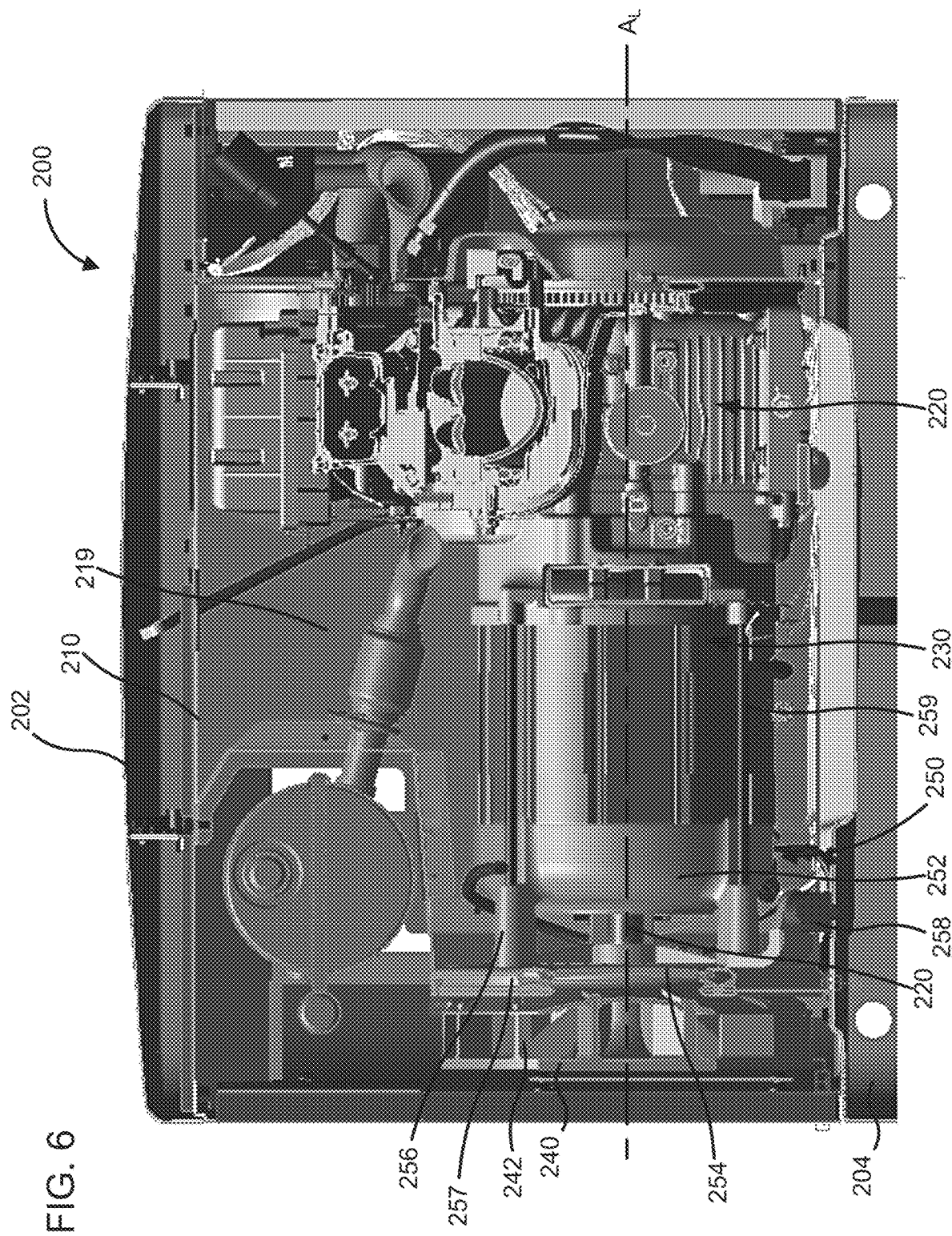
FIG. 6 is a side cross-section view of the genset assembly of FIG. 3 showing the engine, the generator, an inlet cone of the genset assembly positioned within the housing as well as a fan of the genset assembly positioned outside housing.

The inlet cone second portion 254 may also be coupled to the base 204. For example, as shown in FIGS. 6-8, a shock absorber 258 may be used to couple the inlet cone second portion 254 to the base 204. The shock absorber 258 may include a spring isolator, dampers, rubber blocks, metal blocks or any other suitable mounting member, and can be structured to provide shock absorbing and/or vibration damping capabilities.

Figure 10:
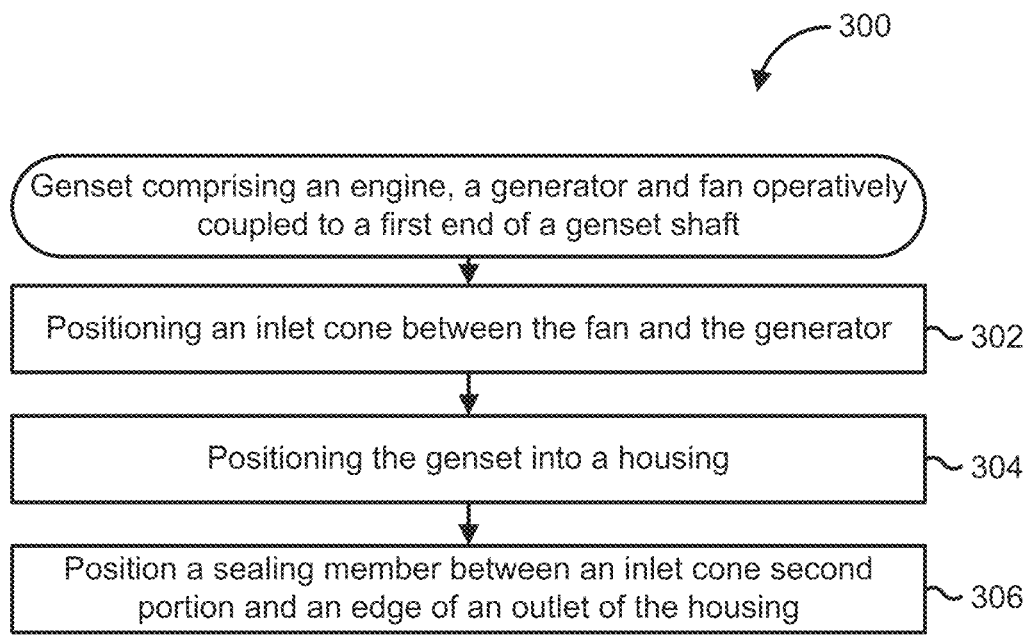
FIG. 10 is a schematic flow diagram of a method of sealing a housing of a generator so as to prevent air from outside of the housing from flowing back into the housing.

FIG. 10 is a schematic flow diagram of an example method 300 of cooling a genset assembly (e.g., the genset assembly 100/200) which comprises an engine (e.g., the engine 120/220) a generator (e.g., the generator 130/230) and a fan (e.g., the fan 140/240) operatively coupled to a first end of a genset shaft (e.g., the genset shaft 122/222) of the genset assembly located distal to the engine.

The method 300 comprises positioning an inlet cone between the generator and the fan at 302. For example, the inlet cone 150/250 is positioned between the generator 130/230 and the fan 140/240 such that an inlet cone first portion 152/252 of the inlet cone 150/250 is positioned proximate to the generator 130/230, an inlet cone second portion 154/254 of the inlet cone 150/250 opposite the inlet cone first portion 152/252 is positioned proximate to a fan sealing portion 144/244 so as to form a close tolerance seal therewith.

The engine and the generator are positioned within an internal volume defined by a housing such that the fan is positioned outside of the internal volume, and the inlet cone second portion is positioned within an outlet of the housing at 304. For example, the engine 120/220 and the generator 230 are positioned within the internal volume 119/219 of the housing 110/210, and the fan 140/240 is positioned is positioned outside the internal volume 119/219 proximal to an outlet of the housing 110/210. The inlet cone second portion 154/254 is positioned within an outlet of the housing 110/210 and proximate to the fan sealing portion 144/244 of the fan 140/240 so as to form a close tolerance seal therewith. The close tolerance seal prevents air downstream of the outlet from flowing into the housing 110/210, as described herein.

A flexible sealing member may be positioned between the inlet cone second portion and an edge of the outlet of the housing at 306. For example, the flexible sealing member 157/257 (e.g., a bulb gasket or seal) may be positioned between the inlet cone second portion 154/254 and an edge 117/217 of the outlet of the housing 110/210, so as to form a close tolerance seal therebetween, as described herein. In some embodiments, the inlet cone second portion may be coupled to a base of the housing. For example, the inlet cone second portion 154/254 may be coupled to the base 104/204 on which the housing 110/210 is positioned via the shock absorber 158/258, as described previously herein.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A genset assembly, comprising:
   a housing defining an internal volume and structured to allow air flow therethrough;
   a generator operatively coupled to an engine within the internal volume via a genset shaft, the generator positioned within the internal volume of the housing;
   a fan operatively coupled to a first end of the genset shaft distal from the engine; and
   an inlet cone, at least a portion of inlet cone is positioned within an outlet defined by the housing, the inlet cone rigidly coupled to at least one of the generator or the engine and positioned coaxially with respect to the fan about an axis of the genset shaft such that the inlet cone and the fan move in concert with one another.

2. The genset assembly of claim 1, wherein the fan is positioned within the internal volume defined by the housing.

3. The genset assembly of claim 1, wherein the fan is positioned outside the internal volume defined by the housing, and wherein the inlet cone is positioned between the generator and fan within the internal volume defined by the housing, the inlet cone comprising an inlet cone first portion positioned proximate to the generator, and the portion of the inlet cone comprises an inlet cone second portion opposite the inlet cone first portion positioned within the outlet defined in the housing, the inlet cone further comprising an inlet cone third portion coupling the inlet cone first portion to the inlet cone second portion,
   wherein the inlet cone second portion is positioned proximate to a fan sealing portion of the fan so as to form a close tolerance seal therewith, the close tolerance seal configured to prevent air downstream of the outlet from flowing into the internal volume of the housing.

4. The genset assembly of claim 3, wherein the housing comprises a first inlet defined in a first sidewall of the housing positioned proximate to an engine first end of the engine distal from the fan, the first inlet structured to deliver air to the engine, the housing further comprising a second inlet defined in a second sidewall of the housing positioned orthogonal to the first sidewall, the second inlet structured to deliver air to the generator, and wherein the outlet is defined in a third sidewall of the housing, the third sidewall positioned opposite the first sidewall.

5. The genset assembly of claim 4, wherein the fan draws air through the first inlet and the second inlet so as to cause the air to flow over the engine and the generator, the fan causing the air to flow through the inlet cone and out of the housing via the outlet, wherein the air flow is substantially along a longitudinal axis of the genset assembly.

6. The genset assembly of claim 3, wherein the inlet cone is positioned about the genset shaft.

7. The genset assembly of claim 3, wherein the inlet cone and the fan are axially aligned along a longitudinal axis of the genset assembly.

8. The genset assembly of claim 3, wherein the inlet cone second portion and the fan sealing portion are separated by a distance of less than 0.2 inches.

9. The genset assembly of claim 3, further comprising a flexible sealing member positioned between the inlet cone second portion and an edge of the outlet of the housing.

10. The genset assembly of claim 3, wherein the housing further comprises a base, at least one of the engine and the generator positioned on the base, and wherein the inlet cone second portion is coupled to the base.

11. The genset assembly of claim 10, further comprising a shock absorber, the shock absorber coupling the inlet cone second portion to the base.

12. The genset assembly of claim 3, further comprising a plurality of coupling rods coupling the inlet cone third portion to the engine.

13. The genset assembly of claim 3, wherein the inlet cone third portion is structured to direct the air towards the fan.

14. The genset assembly of claim 3, wherein the airflow through the housing is a high pressure airflow defining a pressure differential of two or more inches of water relative to an atmospheric pressure.

15. The genset assembly of claim 3, wherein a pressure difference between high pressure air downstream of the outlet and low pressure air upstream of the outlet is in a range of 2 to 10 inches of water inclusive.

16. The genset assembly of claim 3, wherein the inlet cone second portion and the fan sealing portion are separated by a distance of less than or equal to 0.05 inches.

17. The genset assembly of claim 1, wherein the engine is at least one an air cooled engine or a liquid cooled engine.

18. A cooling assembly for a genset that comprises an engine and a generator operatively coupled to the engine via a genset shaft, the cooling assembly comprising:
a housing defining an internal volume structured to house the engine and the generator, and to allow air flow therethrough;
a fan structured to be operatively coupled to a first end of the genset shaft distal from the engine; and
an inlet cone positioned within an outlet defined by the housing the inlet cone structured to be rigidly coupled to at least one of the generator or the engine and positioned coaxially with respect to the fan about an axis of the genset shaft such that the inlet cone and the fan move in concert with one another.

19. The cooling assembly of claim 18, wherein the housing comprises a first inlet defined in a first sidewall of the housing positioned proximate to an engine first end of the engine, the first inlet structured to deliver air to the engine, the housing further comprising a second inlet defined in a second sidewall of the housing positioned orthogonal to the first sidewall, the second inlet structured to deliver air to the generator, and wherein the outlet is defined in a third sidewall of the housing, the third sidewall positioned opposite the first sidewall.

20. The cooling assembly of claim 18, wherein the fan is operational to draw air through the first inlet and the second inlet so as to cause the air to flow over the engine and the generator, the fan causing the air to flow through the inlet cone and out of the housing via the outlet.

21. The cooling assembly of claim 20, wherein the inlet cone is structured to be positioned about the genset shaft.

22. The cooling assembly of claim 18, wherein the inlet cone and the fan are structured to be axially aligned along a longitudinal axis of the genset assembly.

23. The cooling assembly of claim 18, wherein the inlet cone second portion and a fan sealing portion are separated by a distance of less than 0.2 inches.

24. The cooling assembly of claim 18, further comprising a flexible sealing member positioned between the inlet cone second portion and an edge of the outlet of the housing.

25. The cooling assembly of claim 18, wherein the housing further comprises a base structured to receive at least one of the engine and the generator thereon, wherein the inlet cone second portion is coupled to the base.

26. The cooling assembly of claim 25, further comprising a shock absorber coupling the inlet cone second portion to the base.

27. The cooling assembly of claim 18, further comprising a plurality of coupling rods structured to couple the inlet cone third portion to the engine.

28. The cooling assembly of claim 18, wherein the inlet cone third portion is structured to direct the air towards the fan.

29. A method of cooling a genset assembly comprising an engine, a generator and a fan, the method comprising:
positioning an inlet cone within an outlet of a housing defining an internal volume and structured to allow air flow therethrough;
positioning the engine and the generator within the internal volume defined by the housing;
coupling the fan to a first end of a genset shaft of the genset assembly located distal to the engine; and
coupling the inlet cone to the genset assembly such that the inlet cone is positioned coaxially with respect to the fan about an axis of the genset shaft and the inlet cone and fan move in concert with one another.

30. The method of claim 29, further comprising positioning a flexible sealing member between the inlet cone second portion and an edge of the outlet of the housing.

31. The method of claim 29, further comprising coupling the inlet cone second portion to a base of the housing.

* * * * *